(12) United States Patent
de la Oliva et al.

(10) Patent No.: US 12,641,641 B2
(45) Date of Patent: May 26, 2026

(54) TECHNIQUES FOR INCREASING THE RELIABILITY IN IEEE 802.11

(71) Applicant: INTERDIGITAL PATENT HOLDINGS, INC., Wilmington, DE (US)

(72) Inventors: Antonio de la Oliva, Madrid (ES); Robert G. Gazda, Spring City, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 709 days.

(21) Appl. No.: 17/612,077

(22) PCT Filed: May 18, 2020

(86) PCT No.: PCT/US2020/033388
§ 371 (c)(1),
(2) Date: Nov. 17, 2021

(87) PCT Pub. No.: WO2020/236705
PCT Pub. Date: Nov. 26, 2020

(65) Prior Publication Data
US 2022/0210834 A1     Jun. 30, 2022

Related U.S. Application Data

(60) Provisional application No. 62/849,547, filed on May 17, 2019.

(51) Int. Cl.
| | |
|---|---|
| *H04W 74/00* | (2009.01) |
| *H04W 4/06* | (2009.01) |
| *H04W 74/0816* | (2024.01) |

(52) U.S. Cl.
CPC ......... *H04W 74/0816* (2013.01); *H04W 4/06* (2013.01)

(58) Field of Classification Search
None
See application file for complete search history.

(56) References Cited

U.S. PATENT DOCUMENTS

| | | |
|---|---|---|
| 7,599,346 B2 | 10/2009 | Brommer |
| 8,462,686 B2 | 6/2013 | Liu et al. |
| (Continued) | | |

FOREIGN PATENT DOCUMENTS

| | | |
|---|---|---|
| CN | 108200657 A | 6/2018 |
| KR | 100615253 B1 | 8/2006 |
| (Continued) | | |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Gerald A Smarth
(74) *Attorney, Agent, or Firm* — Volpe Koenig

(57)     ABSTRACT

Methods and apparatuses are described herein for increasing reliability in IEEE 802.11 networks. A first station (STA) may generate a set of configurations that meets reliability requirements of a traffic flow associated with a frame. Each of the set of configurations may comprise a number of replications of the frame, a channel bandwidth, and a modulation and coding scheme (MCS). The first STA may transmit, to a second STA, a plurality of request to send (RTS) frames over a plurality of channels. The first STA may receive, from the second STA, a plurality of clear to send (Continued)

(CTS) frames indicating whether the plurality of channels are available. The first STA may then select, based on the number of available channels, a first configuration from the set of configurations. The first STA may transmit, based on the first configuration, a plurality of copies of the frame simultaneously over the available channels.

14 Claims, 13 Drawing Sheets

(56) References Cited

U.S. PATENT DOCUMENTS

| | | | | |
|---|---|---|---|---|
| 10,187,885 | B2 | 1/2019 | Kim et al. | |
| 10,687,281 | B2* | 6/2020 | Son | H04W 74/08 |
| 10,973,051 | B2 | 4/2021 | Lou et al. | |
| 2008/0090575 | A1* | 4/2008 | Barak | H04W 28/18 |
| | | | | 370/310 |
| 2012/0327870 | A1 | 12/2012 | Grandhi et al. | |
| 2016/0113009 | A1* | 4/2016 | Seok | H04W 74/006 |
| | | | | 370/329 |
| 2016/0366701 | A1* | 12/2016 | Chu | H04W 74/004 |
| 2017/0055284 | A1 | 2/2017 | Min et al. | |
| 2017/0251392 | A1* | 8/2017 | Nabetani | H04B 7/0626 |
| 2018/0213558 | A1 | 7/2018 | Kim et al. | |
| 2019/0260531 | A1* | 8/2019 | Chen | H04L 5/0041 |
| 2019/0373439 | A1* | 12/2019 | Abouelseoud | H04B 7/0695 |

FOREIGN PATENT DOCUMENTS

| | | | | | |
|---|---|---|---|---|---|
| WO | WO-2008144323 | A1 * | 11/2008 | | H04L 5/0032 |
| WO | 2010/095793 | | 8/2010 | | |
| WO | 2014179575 | A2 | 11/2014 | | |
| WO | 2015038930 | A1 | 3/2015 | | |
| WO | WO-2016087917 | A1 * | 6/2016 | | H04W 74/00 |
| WO | 2016/131890 | | 8/2016 | | |
| WO | 2018/085677 | | 5/2018 | | |
| WO | WO-2019005027 | A1 * | 1/2019 | | |

OTHER PUBLICATIONS

IEEE Standard for Information technology—Telecommunications and information exchange between systems—Local and metropoli-tan area networks—Specific requirements; Part 11: Wireless LAN Medium Access Control (MAC) and Physical Layer (PHY) Speci-fications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropoli-tan area networks—Specific requirements; Part 11: Wireless LAN Medium Access Control (MAC) and Physical Layer (PHY) speci-fications; Amendment 5: Television White Spaces (TVWS) Opera-tion, IEEE 802.11af-2013 (Dec. 11, 2013).

IEEE Standard for Information technology—Telecommunications and information exchange between systems—Local and metropoli-tan area networks—Specific requirements; Part 11: Wireless LAN Medium Access Control (MAC) and Physical Layer (PHY) Speci-fications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information Technology—Telecommunications and information exchange between systems—Local and metropoli-tan area networks—Specific requirements; Part 11: Wireless LAN Medium Access Control (MAC) and Physical Layer (PHY) Speci-fications; Amendment 2: MAC Enhancements for Robust Audio Video Streaming, IEEE P802.11aa-2012 (May 29, 2012).

IEEE Standard for Information Technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Transit Links within Bridged Networks, IEEE 802.11ak-2018 (Mar. 8, 2018).

IEEE Standard for Local and metropolitan area networks—Frame Replication and Elimination for Reliability, IEEE 802.1cb-2017 (Oct. 2017).

IEEE Standard for Local and metropolitan area networks—Virtual Bridged Local Area Network, IEEE 802.11q-2005 (May 9, 2016).

Ericsson, "Channel access mechanisms for NR-U," 3GPP TSG-RAN WG1 Meeting #94, R1-1811301, Chengdu, China (Oct. 8-12, 2018).

* cited by examiner

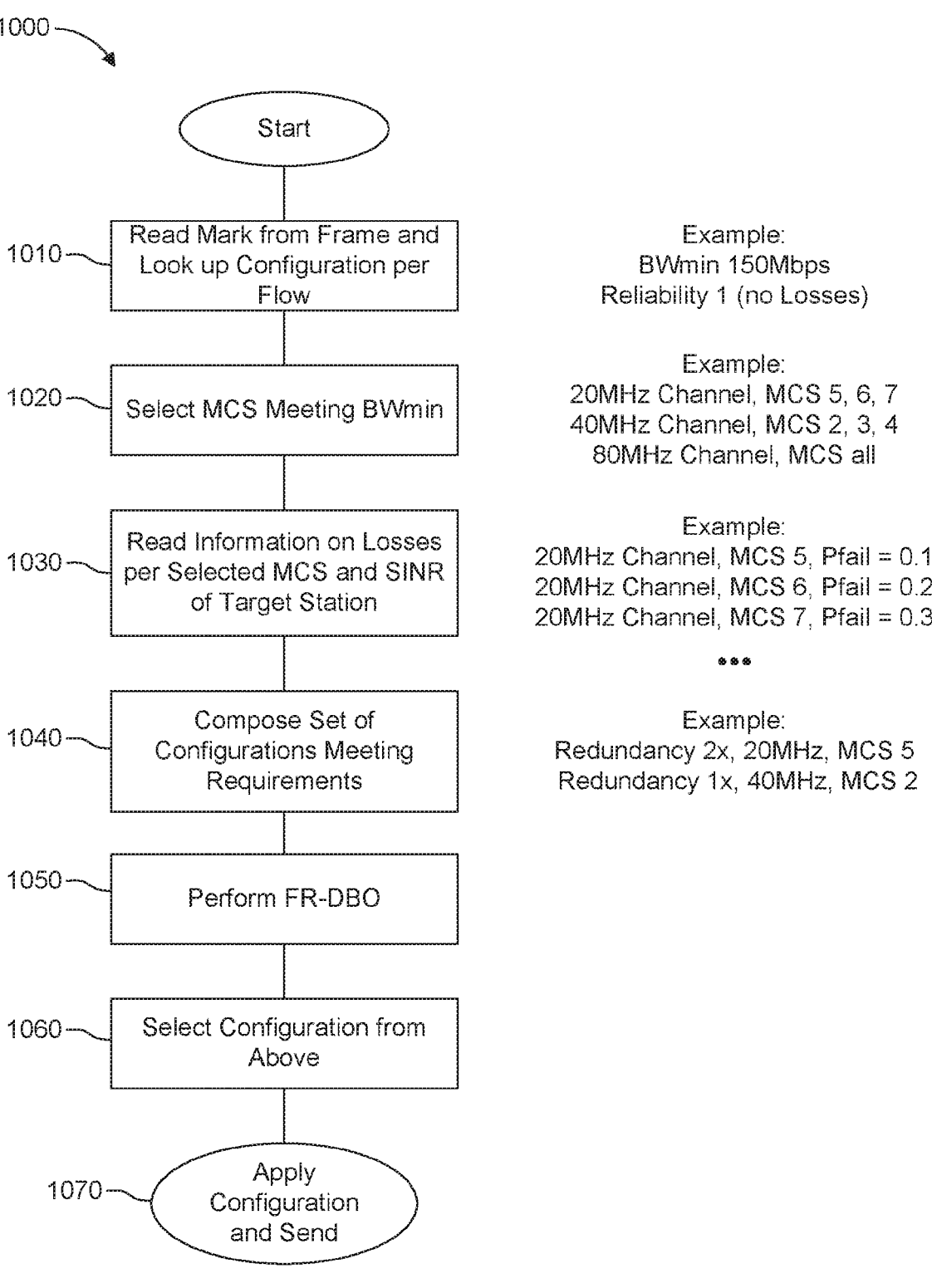

1000

Start

1010 — Read Mark from Frame and Look up Configuration per Flow

Example:
BWmin 150Mbps
Reliability 1 (no Losses)

1020 — Select MCS Meeting BWmin

Example:
20MHz Channel, MCS 5, 6, 7
40MHz Channel, MCS 2, 3, 4
80MHz Channel, MCS all 1030 — Read Information on Losses per Selected MCS and SINR of Target Station Example:
20MHz Channel, MCS 5, Pfail = 0.1
20MHz Channel, MCS 6, Pfail = 0.2
20MHz Channel, MCS 7, Pfail = 0.3

• • •

1040 — Compose Set of Configurations Meeting Requirements

Example:
Redundancy 2x, 20MHz, MCS 5
Redundancy 1x, 40MHz, MCS 2

1050 — Perform FR-DBO

1060 — Select Configuration from Above

1070 — Apply Configuration and Send

FIG. 10

TECHNIQUES FOR INCREASING THE RELIABILITY IN IEEE 802.11

CROSS REFERENCE TO RELATED APPLICATION

This application is the U.S. National Stage, under 35 U.S.C. § 371, of International Application No. PCT/US2020/033388 filed May 18, 2020, which claims the benefit of U.S. Provisional Application No. 62/849,547, filed May 17, 2019, the contents of which are incorporated herein by reference.

BACKGROUND

Ultra-Reliable Low Latency Communication (URLLC) is a set of features that provide low and deterministic delay communications (e.g., with end-to-end latency lower than 10 ms) and ultra-high reliability for mission critical applications that cannot tolerate loss of data. Although it was introduced in 5G, URLLC may be considered for other access technologies such as Wireless Local Area Network (WLAN). Currently, there are several mechanisms to increase the reliability in 802.11 networks. For example, the transmission rate may be decreased to increase the range of transmission, thereby effectively reducing the Signal to Interference plus Noise Ratio (SINR) needed for success reception. Also, the protection of frame may be increased by adding more complex Forward Error Correction (FEC) or error correction techniques. However, these mechanisms are not enough to enable URLLC-level communications due to the increased delays in case of packet losses, complexity, and no reservation of medium for multicast/groupcast transmissions. Thus, methods and apparatuses that increase the reliability in IEEE 802.11 networks are needed.

SUMMARY

Methods and apparatuses are described herein for increasing the reliability in IEEE 802.11 networks. For example, a first station (STA) may generate at least one set of configurations that meets one or more reliability requirements of a traffic flow associated with a frame. Each of the at least one set of configurations may comprise a number of replications of the frame, a channel bandwidth, and a modulation and coding scheme (MCS) associated with the channel bandwidth. The first STA may then transmit, to a second STA, a plurality of request to send (RTS) frames over a plurality of channels, for example, using a multicast medium access control (MAC) address associated with the second STA. The first STA may receive, from the second STA, a plurality of clear to send (CTS) frames indicating whether the plurality of channels are available. Based on the availability of the plurality of channels, the first STA may determine a number of available channels. The first STA may then select, based on the number of available channels a first configuration from the at least one set of configurations. The first configuration meets the one or more reliability requirements of the traffic flow and may include a first number of replications of the frame, a first channel bandwidth, and a first MCS associated with the first channel bandwidth. The first STA may transmit, based on the first configuration, a plurality of copies of the frame simultaneously over the available channels.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 10 is a diagram illustrating an example procedure for transmissions of multiple copies of a frame based on FR-DBO and a configuration of MAC properties as a function of the reliability factor;

DETAILED DESCRIPTION

Figure 1A:
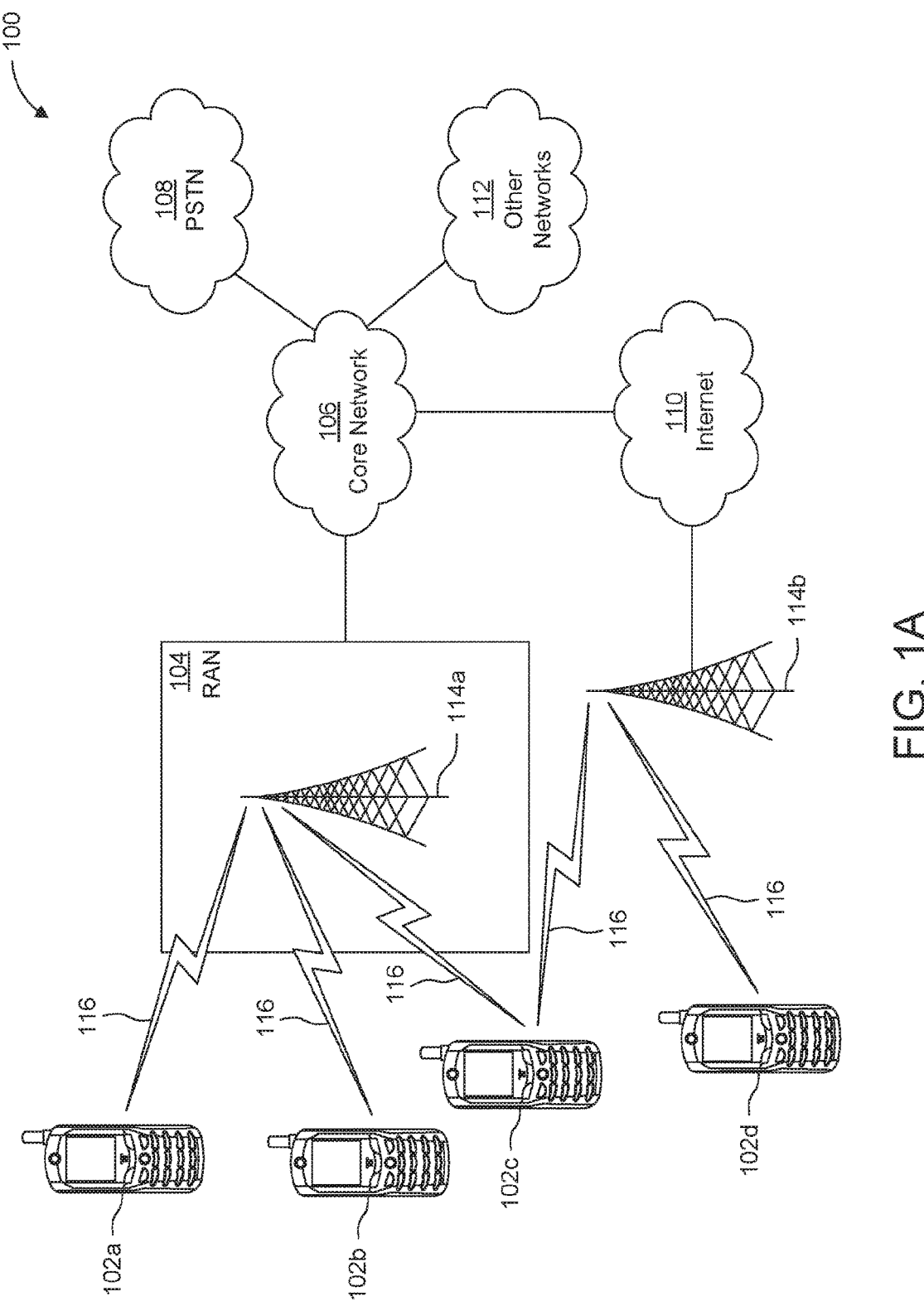
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
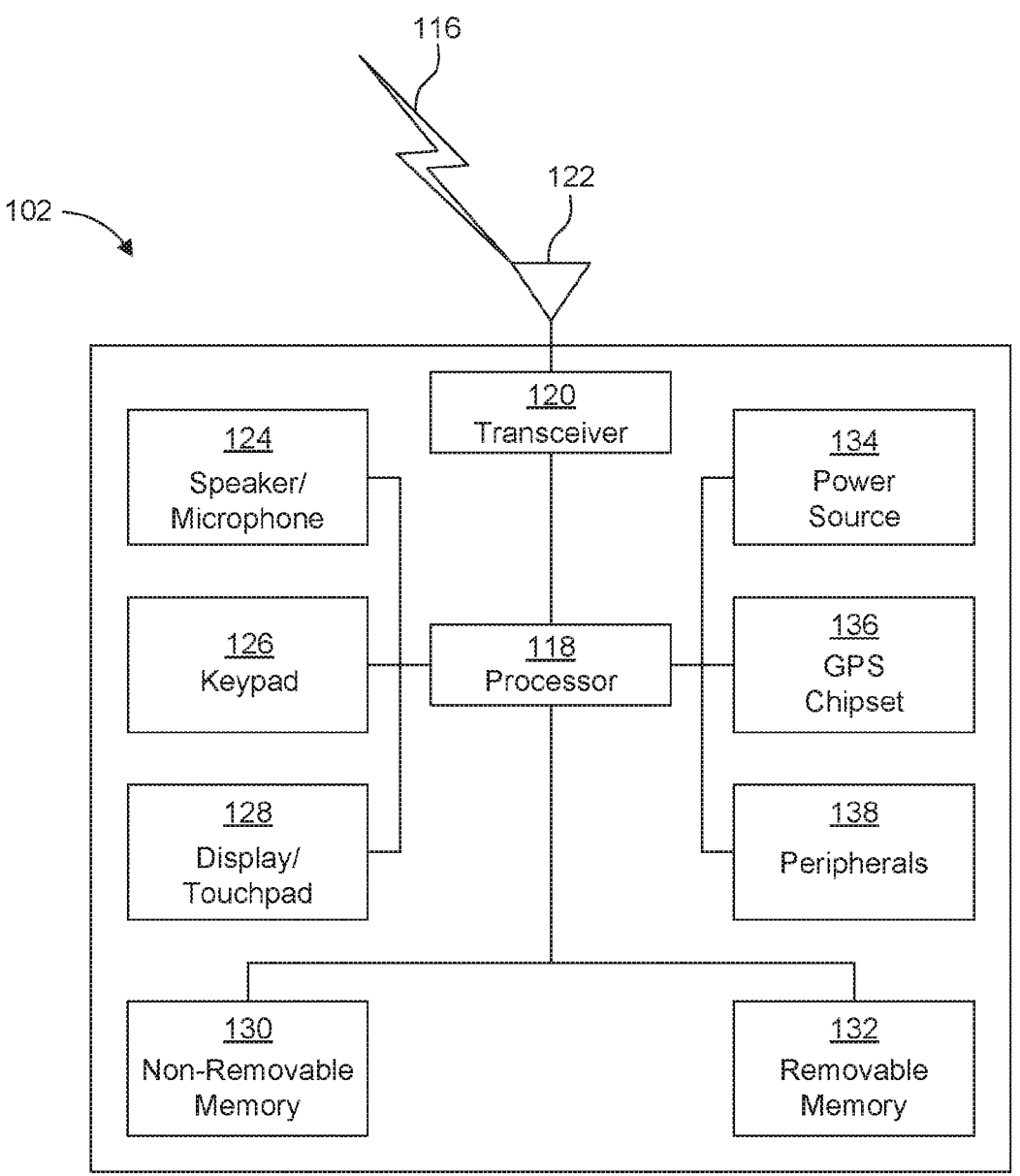
FIG. 1B is a system diagram illustrating an example wireless transmit/receive unit (WTRU) that may be used within the communications system illustrated in FIG. 1A according to an embodiment.
Figure 1C:
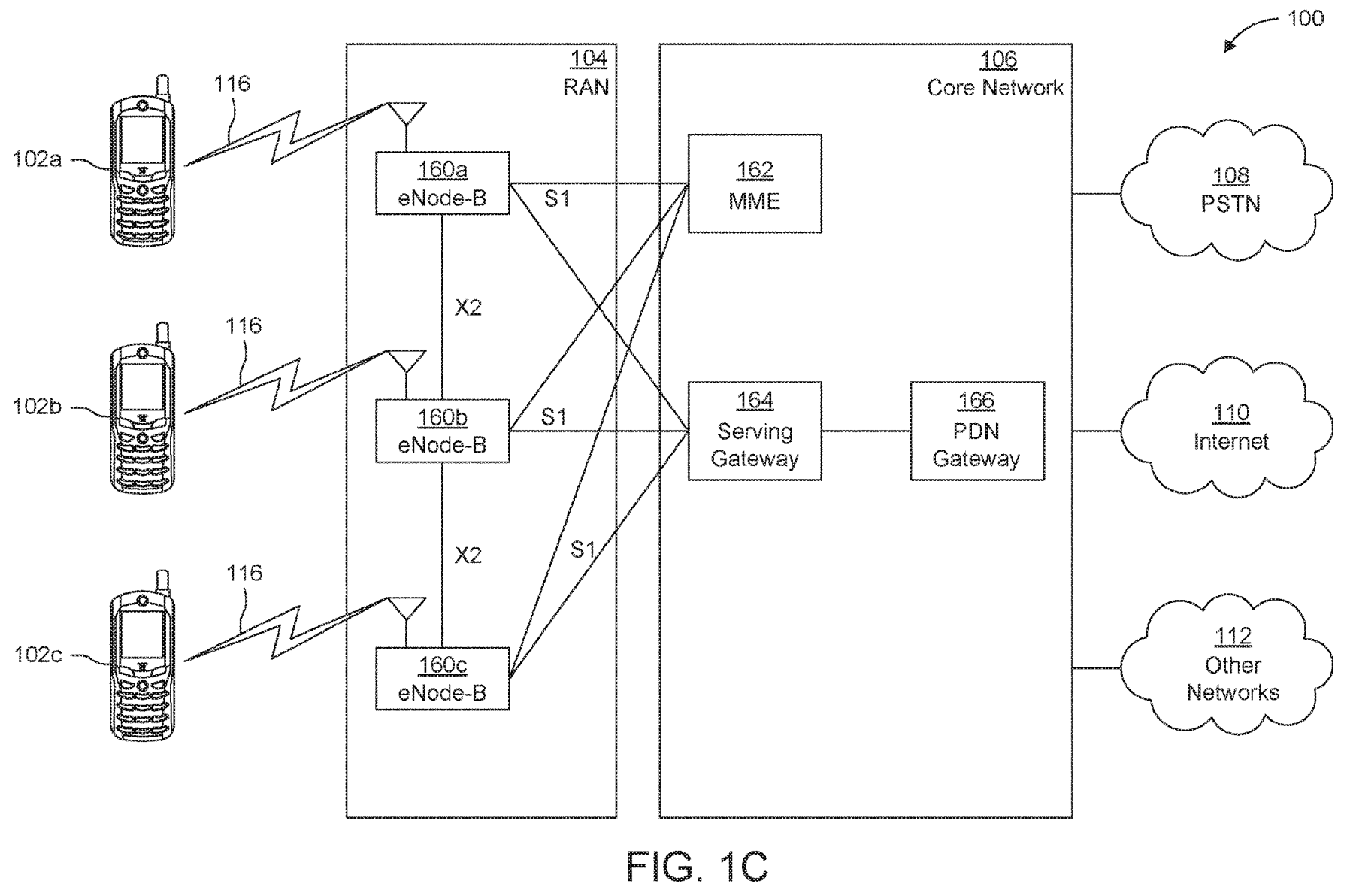

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
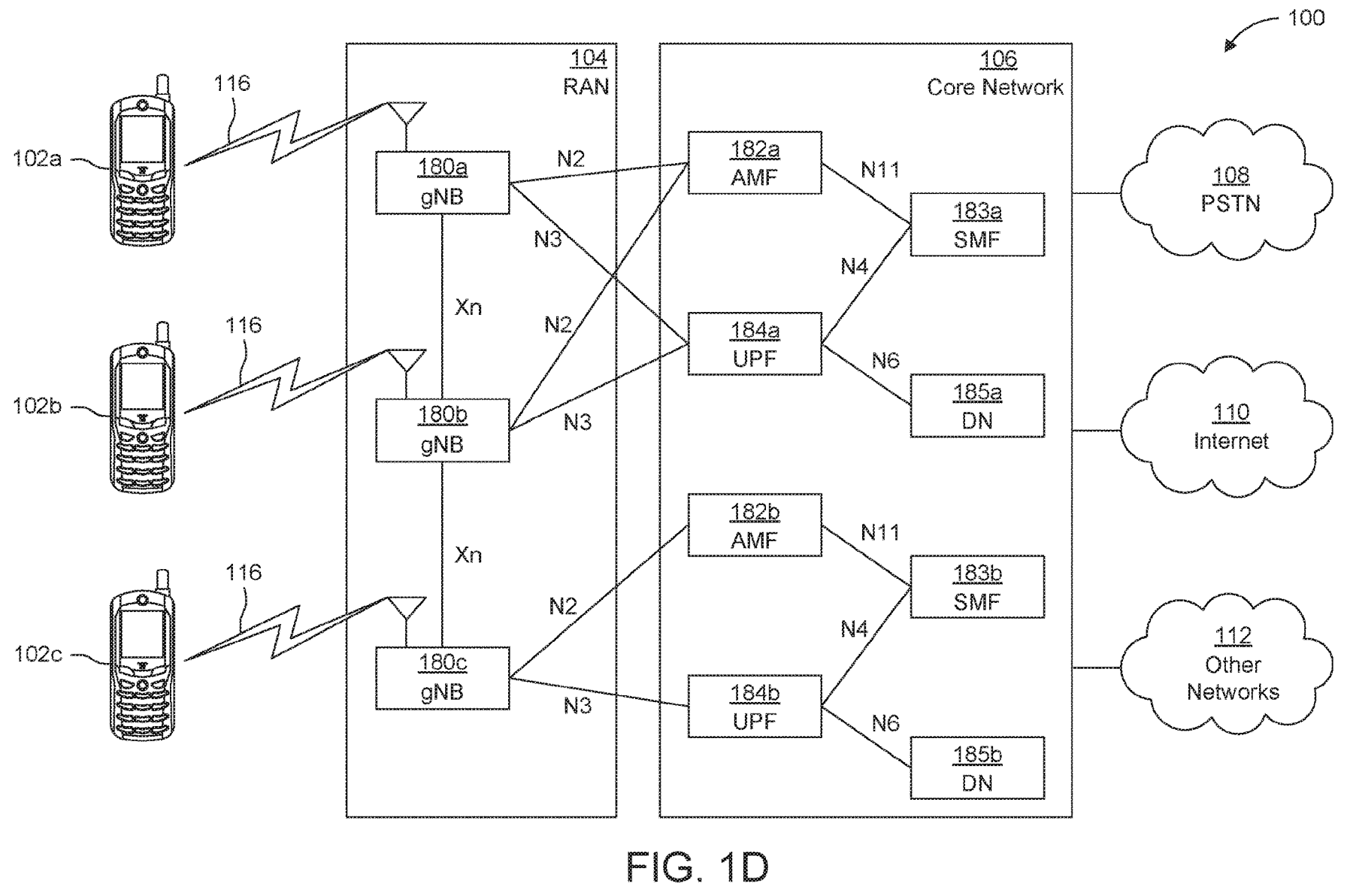

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Ultra-Reliable Low Latency Communication (URLLC) is applicable to 3rd Generation Partnership Project (3GPP) in 5G, and may also be considered for other access technologies, such as WLAN, which has use cases such as in-home networking and Consumer Electronic (CE) devices, where WLAN is a dominate access technology. URLLC may by described as having several components, such as a focus on the low and deterministic delay communications, for example, with end-to-end latency lower than 10 ms, and a focus on reliability for mission critical applications that cannot tolerate loss of data. In IEEE 802.11, real time communications may need very low and deterministic latency and high reliability for some use cases.

Groupcast transmissions may be transmissions addressed to a group of stations following rules for transmission (e.g., IEEE 802.11aa). These transmissions may be addressed to a concealment MAC address (e.g., multicast MAC address) that is used to prevent stations not in the group from processing such packets.

To increase the reliability of transmission to a group of stations, there may be several mechanisms that are referred to as Groupcast with Retries (GCR), such as GCR Unsolicited Retries, GCR Direct Multicast, and/or GCR Block ACK.

GCR Unsolicited Retries may be used where each frame is repeated a predefined number of times.

GCR Direct Multicast may be used where a multicast stream is transformed in several unicast streams which are directed to the different stations that conform the group. This means that the multicast transmission may effectively become a set of unicast transmissions.

GCR Block ACK may be used where a block of frames are sent to the group. Once a block is sent, the AP requests from each station in the group which frames of the block have not been received.

These GCR mechanisms may be different from the normal multicast operation of the network and can use a higher modulation scheme to achieve higher speed, in contrast to normal multicast (known as Non-ACK) which uses a low MCS to increase the probability of reception by all stations. These GCR mechanisms may require a technique to reserve the medium before using any of these mechanisms to reduce the probability of collision.

In a related situation, there may be model for IEEE 802.11 to interact with IEEE 802.1Q networks. This model, known as Generic Links (GLK), enables an IEEE 802.11 network to connect and behave as an IEEE 802.1Q compatible port. This may be done through the creation of point-to-point or point-to-multipoint logical links connecting the different stations, where each of these links appear as a bridge port. A characteristic of GLK ports is that one port may connect to different stations; therefore there is the need to have groupcast communication with different nodes. One example of this is the connection of a set of wireless bridges and the need to only communicate with some of them to avoid loops (e.g., Spanning Tree decisions). GLK-GCR may not use a concealment groupcast address such as the standard GCR. However, a synthetic address known as Synthetic Receiver Address (SYNRA) may be used to group Association IDs, and to identify the stations that should process the frame. Accordingly, in GLK, there is a need to use GCR transmission, and therefore a need for a technique to reserve air time.

IEEE 802.11n may utilize channel bonding as a mechanism for increasing the available throughput of wireless networks. IEEE 802.11 base standards work with a base channel bandwidth of 20 MHz. To increase the bandwidth available for transmission, IEEE 802.11n may use a mechanism by which several 20 MHz channels are bonded into a bigger channel. In this way, bonded channels in IEEE 802.11n may reach 80 MHz, and this approach may be extended in IEEE 802.11ac to achieve up to 160 MHz (8×20 MHz) or 80+80 MHz channels (4×20 MHz+4×20 MHz).

However, channel bonding in general may not always work as expected, due to the overall saturation of Industrial, scientific and medical (ISM) channels used in the bands of IEEE 802.11. Channel bonding in IEEE 802.11n may work by the STA performing Clear Channel Assessment (CCA) over a predefined and unique channel of a width equivalent to the sum of multiple channels. Due to the saturation of the wireless medium, typically this CCA procedure may not be successful since the required bandwidth may not be free simultaneously, making channel bonding less than ideal in certain situations.

IEEE 802.11ac may address the channel bonding issue by utilizing the concept of Dynamic Bandwidth Operation (DBO), in which the STAs wanting to transmit negotiate the channels to bond prior to transmission of the frame. DBO may be work with a very high throughput (VHT) station (STA) in which the request-to-send/clear-to-send (RTS/CTS) exchange, using non-high-throughput (non-HT) duplicate physical layer (PHY) protocol data units (PPDUs), negotiates a potentially reduced channel width (compared to the channel width indicated by the RTS) for subsequent transmissions within the current transmission opportunity (TXOP).

Figure 2:
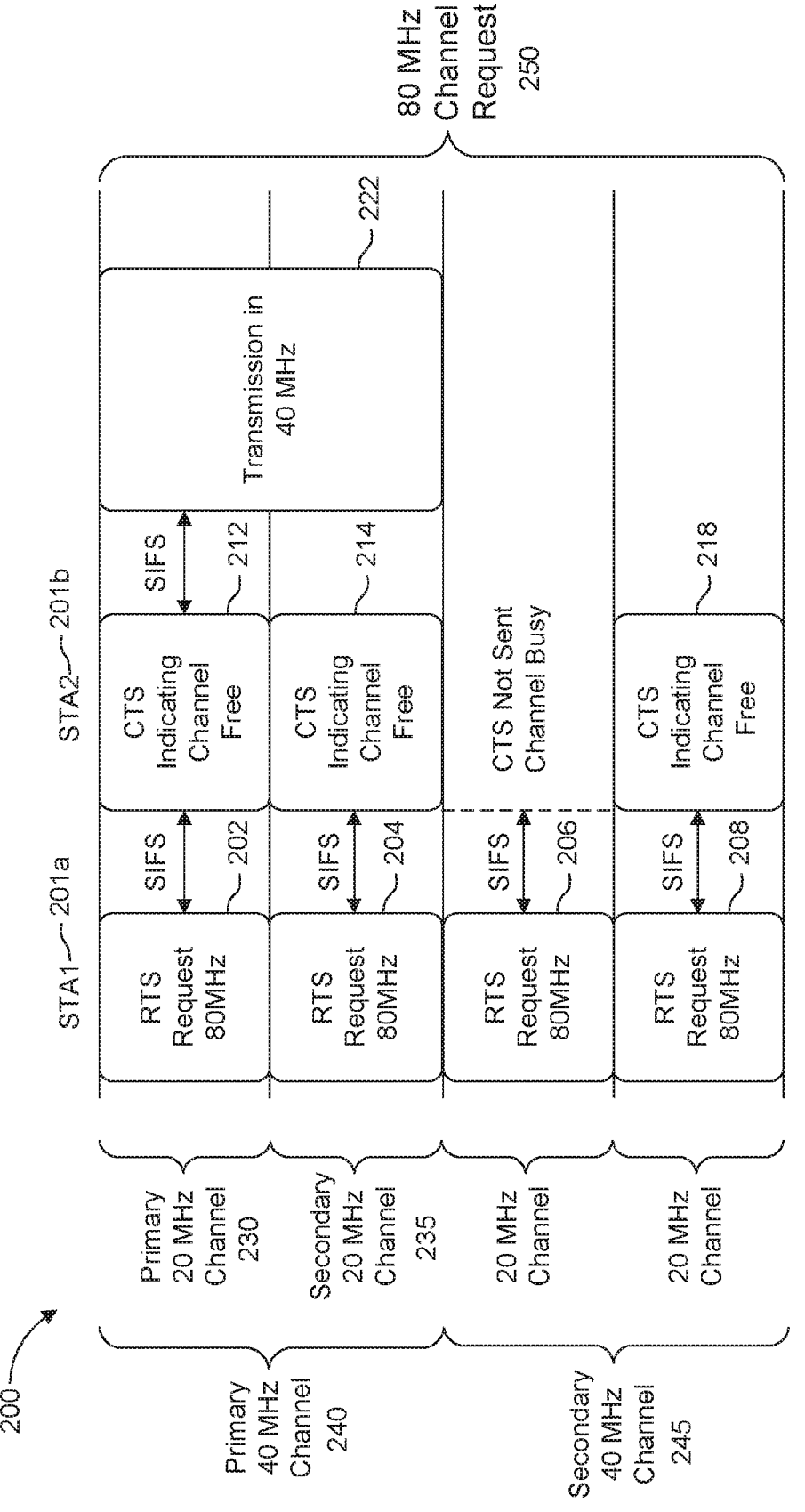
FIG. 2 is a diagram illustrating an example dynamic bandwidth operation (DBO)

FIG. 2 illustrates an example dynamic bandwidth operation (DBO) 200 where an 80 MHz channel is requested but a 40 MHz channel is granted, which may be used in combination with any of other embodiments described herein. As illustrated in FIG. 2, STA1 201a may transmit multiple RTS frames 202, 204, 206, 208 (e.g., requesting 80 MHz) to STA2 201b in all the channels that STA1 201a has identified in order to figure out which channels are available. In response to the multiple RTS frames 202, 204, 206, 208, STA1 201a may receive, from STA2 201b multiple CTS frames 212, 214, 218 indicating whether the channels received the RTS frames 202, 204, 206, 208 are available. As illustrated in FIG. 2, STA1 201a receives three CTS frames 212, 214, 218 indicating that the channels received the RTS frames 202, 204, 208 are available. Since the primary 20 MHz channel and secondary 20 MHz channel are contiguous and both are available, STA1 201a may aggregate those channels to a 40 MHz channel 222 and transmit date over the 40 MHz channel 222.

More particularly, in order to transmit in several 20 MHz channels, IEEE 802.11ac may require that the STA1 201a receives a CTS frame 212 for its primary 20 MHz channel 230 and its secondary 20 MHz channel 235 (e.g., for a 40 MHz channel 240). For example, if 80 MHz channel bonding 250 is desired, the primary 40 MHz channel 240 needs be free and also the secondary 40 MHz channel 245. This schema may focus on bonding channels; therefore, its objective may be to find the sets of primary and secondary channels yielding to the maximum bandwidth bonded channel available. This schema may have strict rules on the operation of secondary channel enforced in the standard. Use of disjointed channels (i.e. non-contiguous) may not be allowed but for the case of 80+80 MHz allocation. The DBO mechanism illustrated in FIG. 2 results on a unique transmission across a channel with bandwidth equal to the sum of the bandwidths of the different channels available and may be used for unicast transmission.

Figure 3:
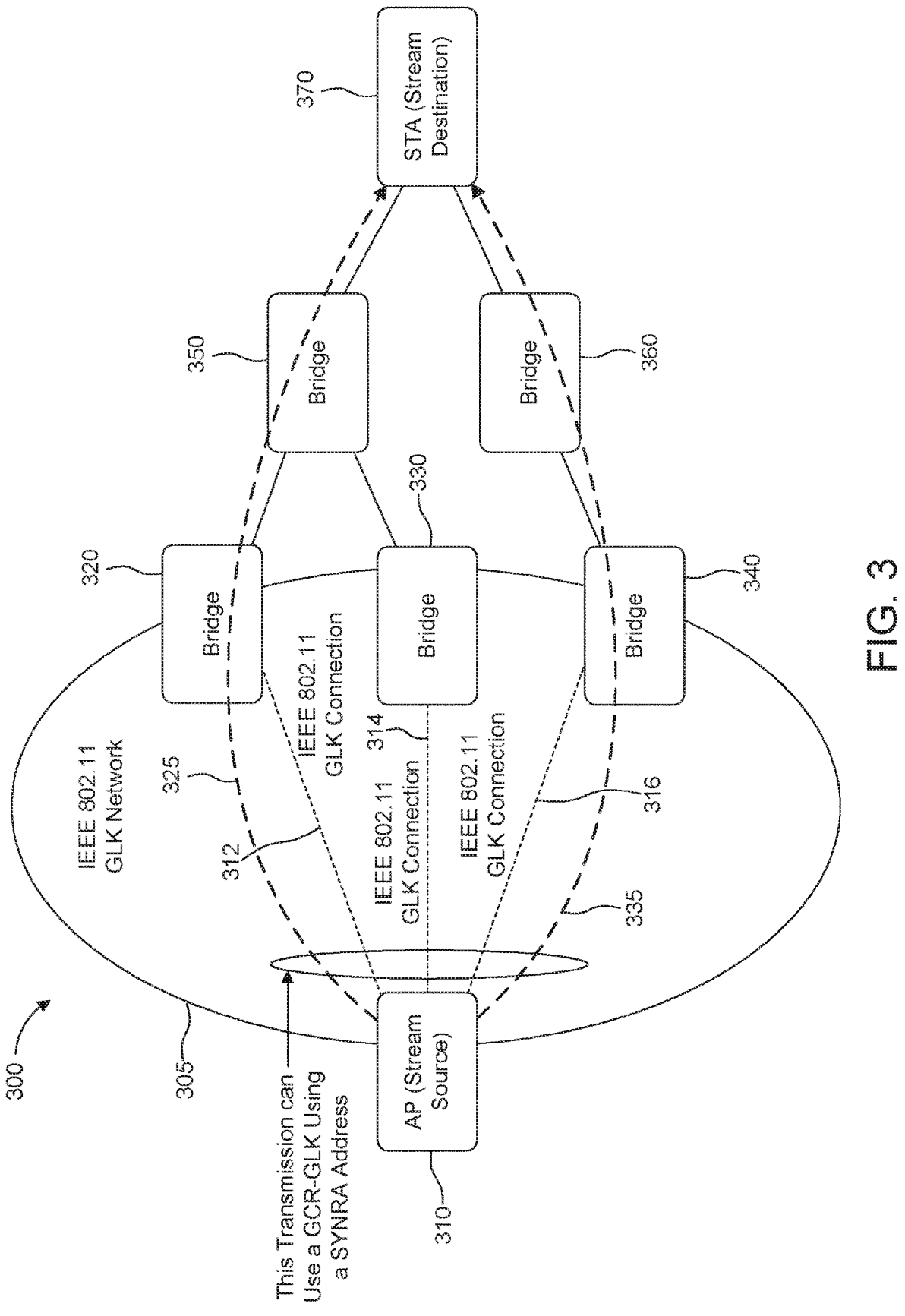
FIG. 3 is a diagram illustrating an example of frame replications and elimination for reliability (FRER)

FIG. 3 illustrates an example of Frame Replication and Elimination for Reliability (FRER) 300 in WLAN, which may be used in combination with any of other embodiments described herein. The FRER mechanism (e.g., IEEE 802.1CB) may enable IEEE 802.1Q switches to perform duplication of frames, sequencing of them, and elimination of duplicated frames either at the end points of the communication or at intermediate points. Generic Links (GLK), IEEE 802.11ak specification, may enable the FRER mechanism to also be applied to IEEE 802.11 networks, as it is shown in FIG. 3. As illustrated in FIG. 3, an AP 310 as a source of stream is connected to a STA 370 as the stream destination via multiple bridges 320, 330, 340, 350, 360. The AP 310 and bridges 320, 330, 340 may form an IEEE 802.1 GLK network by connection each other via IEEE 802.11 connections 312, 314, 316. The AP 310 may be the source of a stream which requires high reliability. The AP 310 may append a tag to the frame including a sequence number for replications and may send the frame via two disjoint paths 325, 335 to the STA 370 in the wireless network. For example, this can be achieved using a GLK-GCR transmission, using a SYNRA address as RA in the frame and sending it to 2 stations (i.e. Bridges 320, 340) out of the 3 stations (i.e. Bridges 320, 330, 340) in the link. In this way, through one single transmission, the frame is duplicated.

As presented above, IEEE 802.11 includes mechanisms by which a station may be able to negotiate the available bandwidth (20, 40, 80, 80+80 MHz) through the Dynamic Bandwidth Operation (DBO). A DBO mechanism may not be available for groupcast or multicast transmissions; therefore an implementation of FRER as described above may use a static channel allocation.

There may be several approaches for increasing reliability in 802.11. In an example, the rate at which a frame is transmitted may be decreased, which may increase the range of the transmission by effectively reducing the SINR needed for successful reception. In an example, the protection of the frame may be increased, by adding a more complex FEC or including error correction techniques. In an example, several copies of transmission frames may be sent, as is done in IEEE 802.11aa. In an example, in IEEE 802.1 networks, IEEE 802.1CB (Frame Replication and Elimination for Reliability, FRER) may be used; also, FRER in IEEE 802.11 networks may require of groupcast transmission (using IEEE 802.11ak GLK SYNRA addresses), and there may be a need for a technique for reserving the channel for groupcast or multicast transmissions.

These approaches may not enable URLLC-level communications for some scenarios. In an example, in one scenario there may be mechanisms that use sequential transmission of redundant frames, therefore increasing the delay in case of packet losses. In an example, in one scenario there may be no mechanism to reserve the medium prior to the transmission of groupcast/multicast frames, therefore collisions may occur, significantly decreasing the performance of the channel. In an example, in one scenario optimized channel bonding (e.g., using Static Bandwidth Operation (SBO)) may not be used for multicast/groupcast, therefore these transmissions may not able to use high MCS as developed in 802.11ac/802.11ax.

Therefore, there is a need to address how reliability in IEEE 802.11 can be increased, by the simultaneous transmission of multiples copies of the same frame, while using opportunistic channel bonding and a high MCS to maintain lowest possible latency. This need may be addressed by embodiments disclosed herein.

There may be one or more embodiments that focus on increasing the reliability of IEEE 802.11 to meet those required by URLLC level applications by extending mechanisms for medium reservation (RTS/CTS) with the following functionalities: (1) GCR-RTS/CTS to reserve the channel for a group of stations and extensions to the Dynamic Bandwidth Operation mechanisms of IEEE 802.11ac to find the best channel allocation for the groupcast transmission; (2) definition of the use of FRER within an IEEE 802.11ak GLK network and the use of the GLK GCR-RTS/CTS mechanism to reserve the medium and find the best allocation of channels to optimize the throughput of the GCR-GLK transmission; (3) enhancements to the Dynamic Bandwidth Operation mechanism of IEEE 802.11ac for the use of several channels to send replicas of a frame to a station; and/or (4) mechanism(s) for an STA to define the level of reliability and its mapping to number of copies to be transmitted and needed bandwidth allocation, as well as configuration of the STA's MAC layer mechanisms.

In one embodiment using Groupcast with Retries (GCR) RTS/CTS, the RTS/CTS may be extended for groupcast transmission, enabling all stations in a group to reserve air time. The GCR RTS/CTS may need to address all stations in the group since hidden nodes may be present in the network and only the use of both RTS and CTS will safely block the Network Allocation Vector (NAV) of the rest of the stations of the network.

Figure 4:
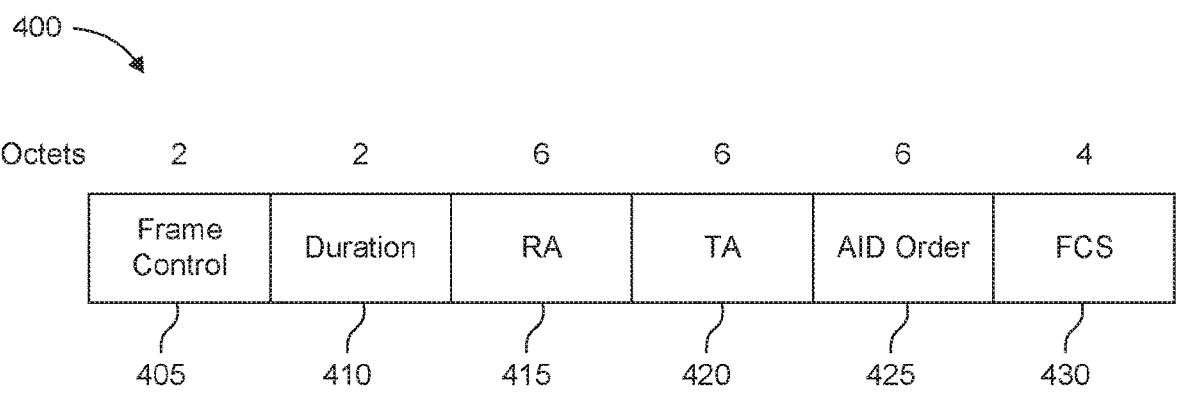
FIG. 4 is a diagram illustrating an example groupcast with retries-request to send (GCR-RTS) frame format.

FIG. 4 illustrates an example groupcast with retries-request to send (GCR-RTS) frame format 400, which may be used in combination with any of other embodiments described herein. The RTS/CTS format may be enhanced and include new rules for air time reservation time defined in the duration field. The GCR-RTS frame may be defined as a new Control Frame for IEEE 802.11. As illustrated in FIG. 4, the GCR-RTS frame 400 may include a frame control field 405, a duration field 410, a receiver address (RA) field 415, a transmit address (TA) field 420, an association ID (AID) order field 425, and a FCS field 430.

The duration value in the Duration Field 410 of the frame may need to be set to the estimated time, in microseconds, required to transmit the pending frame, plus as many GCR-CTS frames as stations in the group separated by IFS, plus one ACK or Block ACK frame if required, plus any Null Data Packets (NDPs) required, plus explicit feedback if required, plus applicable IFSs.

The RA field 415 value of the GCR-RTS frame 400 may be the concealment groupcast address of the group of stations to answer the GCR RTS/CTS exchange. The TA field 420 may follow the same rules as certain legacy IEEE 802.11 protocols. The association ID (AID) order field 425 may be used to present a list of Association Identifiers in order, which may be used to answer the GCR-RTS, in the order presented in the list. This field may follow the same format as the SYNRA address.

Figure 5:
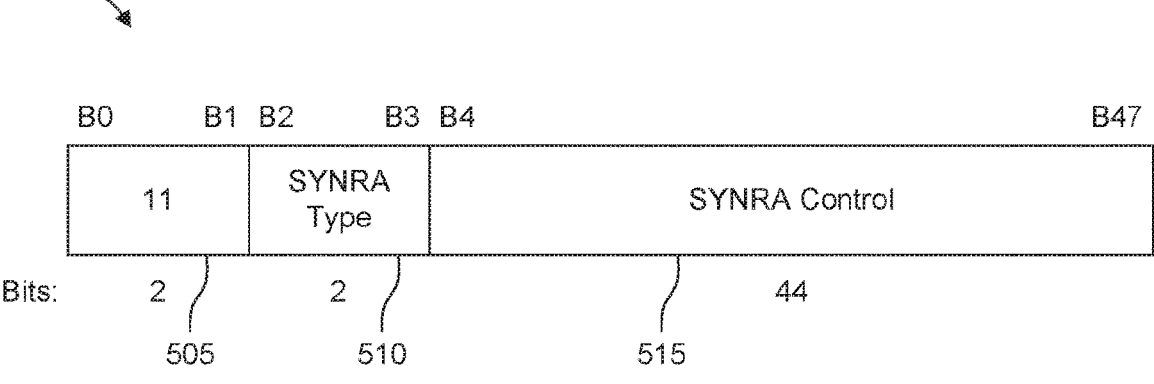
FIG. 5 is a diagram illustrating an example synthetic receiver address (SYNRA) format.

A SYNRA may be defined as a 48 bits synthetic address which provides a list of AIDs in a compact way (e.g., format in IEEE 802.11ak). FIG. 5 illustrates an example synthetic receiver address (SYNRA) format 500, which may be used in combination with any of other embodiments described herein. As illustrated in FIG. 5, the SYNRA format 500 may include an 11 field 505, a SYNRA type field 510, and a SYNRA control field 515.

Figure 6:
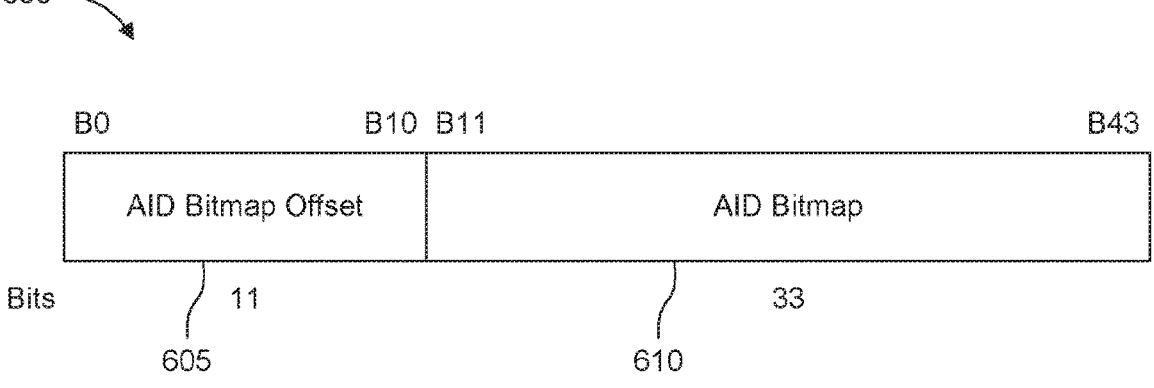
FIG. 6 is a diagram illustrating an example association identifier (AID) order SYNRA type format.

There may be another type of SYNRA based on Table 1, where the AIR Order SYNRA control is based on FIG. 6, which illustrates an example AID Order SYNRA Type format 600, which may be used in combination with any of other embodiments described herein.

TABLE 1

| Value | Description |
| --- | --- |
| 0 | Basic SYNRA |
| 1 | AID Order |
| 2-3 | Reserved |

As illustrated in FIG. 6, the AID Order SYNRA Type forma 600 may include an AID Bitmap Offset subfield 605 and an AID Bitmap subfield 610. The AID Bitmap Offset subfield 605 in an AID Order SYNRA Control may be used to indicate the starting AID value, which is associated with bit 0 of the AID Bitmap subfield 610. For example, its value may be generated by multiplying by 4 to find the starting AID value, and may have a value from 0 to 494 for a non-S1G STA, or 0 to 2040 for a S1G STA. Other values may be reserved.

The AID Bitmap subfield 610 in an AID Order SYNRA Control may provide the indication of the need to answer with a GCR-CTS frame for a range of, for example, 33 consecutive AIDs. For example, Bits B11 to B43 represent AID values in the range AID Bitmap Offsetx4+1 to AID Bitmap Offsetx4+33, respectively. For each bit in the AID Bitmap subfield, a value of 1 indicates a GCR-CTS frame is expected, and a value of 0 indicates a GCR-CTS frame is not expected. The order in which the bits appear may indicate the order of sending the GCR-CTS frames by the stations.

Figure 7:
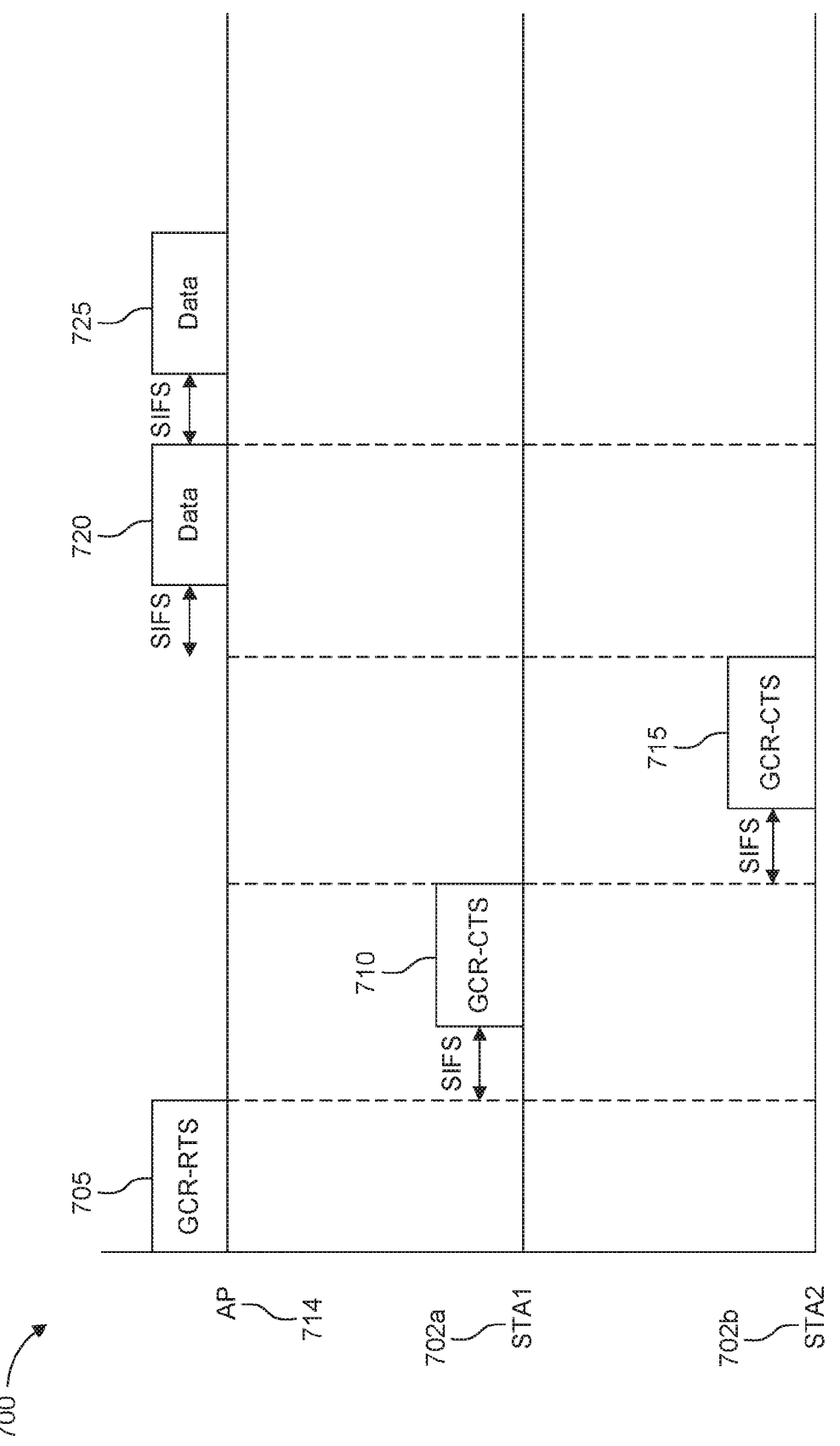
FIG. 7 is a diagram illustrating an example operation with groupcast with retries-request to send/clear to send (GCR-RTS/CTS)

FIG. 7 illustrates an example operation 700 with group-cast with retries-request to send/clear to send (GCR-RTS/CTS) frames, which may be used in combination with any of other embodiments described herein. As illustrated in FIG. 7, an AP 714 (or a STA) may groupcast a GCR-RTS frame 705 to a group of STAs comprising STA1 702a and STA2 702b. The GCR-RTS frame 705 may include an AID Order field including a list of AIDs in order. The list of AIDs indicate which STAs respond GCR-CTS frames 710, 715 in which order in response to the GCR-RTS frame 705. For example, STA1 702a may have an Association Identifier (AID) which is located in AID Bitmap before the one of STA2 and respond the GCR-CTS frame 710 to the AP 714 earlier than the GCR-CTS frame 715 from STA2 702b. After the AP 714 receives the GCR-CTS frames 710, 715, the AP 714 understand which channels are available between the AP 714 and the STAs 702a, 702b. Based on this availability information, the AP 714 may transmit data 720, 725 over the available channels.

The example GCR-RTS/CTS operation illustrated in FIG. 7 may present overhead when many STAs are addressed. At the same time, this overhead needs be considered together with the benefit of avoiding retransmissions due to collisions when multiple frames are exchanged using, for example, the GCR Block mechanism.

The GCR-CTS frames 710, 715 may be equal to a standard CTS frame, except on the duration field which may need to include the time needed for the rest of STAs indicated in the AID Bitmap after its position, plus all the IFS between them.

In one example of GCR-RTS/CTS, the originating AP 714 or STA may transmit a GCR-RTS message 705 with a SYNRA in the AID Order field. This GCR-RTS message 705 may be sent to the concealment MAC address (or multicast MAC address) of the group comprising STAs such as STA1 702a and STA2 702b. The AID Order may indicate which STAs need reply in which order (e.g., by providing the AIDs). The STAs 702a, 702b addressed will answer with GCR-CTS messages 710, 715, in the order indicated in the SYNRA. As a result, no collisions occur in the CTS between the addressed STAs 702a, 702b.

In one embodiment, generic link (GLK)-GCR RTS/CTS frames may be used. This may be a similar approach as GCR-RTS/CTS, but considers the case of Generic Link (GLK) (IEEE 802.11ak) compatible networks. GLK has considerations that make the case different from GCR-RTS/CTS, such as there may be no concealment addresses and groupcast messages sent to a SYNRA address directly.

There may be one or more differences between GCR and GLK GCR, such as in the case of GLK stations, IEEE 802.11ak groups of stations may be addressed by a basic SYNRA as specified in Clause, and in IEEE 802.11ak, the SYNRA may be setup on association and may need to be used to address the stations since no GCR concealment address is available.

For this reason, for the GLK-GCR RTS/CTS, use of the AID Order SYNRA may be enhanced to transport it in the RA field of an RTS frame. Therefore, the format of the GLK-GCR RTS frame may be the same as a standard RTS frame but using an AID Order SYNRA as the RA. Note that stations receiving the AID Order SYNRA may answer the GLK-GCR RTS frame with a GLK-GCR CTS frame in the order established in the AID Order Bitmap. The duration field of the GLK-GCR RTS frame may need to be set to the estimated time, in microseconds, required to transmit the pending frame, plus as many GLK-GCR CTS frames as stations in the group separated by IFS, plus one ACK or Block ACK frame if required, plus any Null Data Packets (NDPs) required, plus explicit feedback if required, plus applicable IFSs.

The behavior of the APs and STAs may be same as previous discussed herein, with the difference on the format of the GLK-GCR RTS/CTS SYNRA address, which may use an AID Order SYNRA.

These approaches, regarding GLK-GCR RTS/CTS and GCR RTS/CTS, may be described herein to explain techniques for FRER in IEEE 802.11 networks.

In one embodiment, there may be the discovery of channels available for unicast transmission using DBO. As previously discussed, one way to increase reliability in a WLAN network is to send several copies of the same data. This is typically done at the MAC layer by sending consecutive copies of the data in the same channel. This method uses Dynamic Channel Operation to discover and reserve multiple channels, but instead of sending a single PLCP Protocol Unit (PPDU) in the entire discovered bandwidth, duplicated copies of the PPDU may be sent in the multiple channels, effectively reducing the probability of losing the frame. This may decrease transmission bandwidth, but improve reliability; this mechanism may be called Frame Replication-DBO (FR-DBO).

Figure 8:
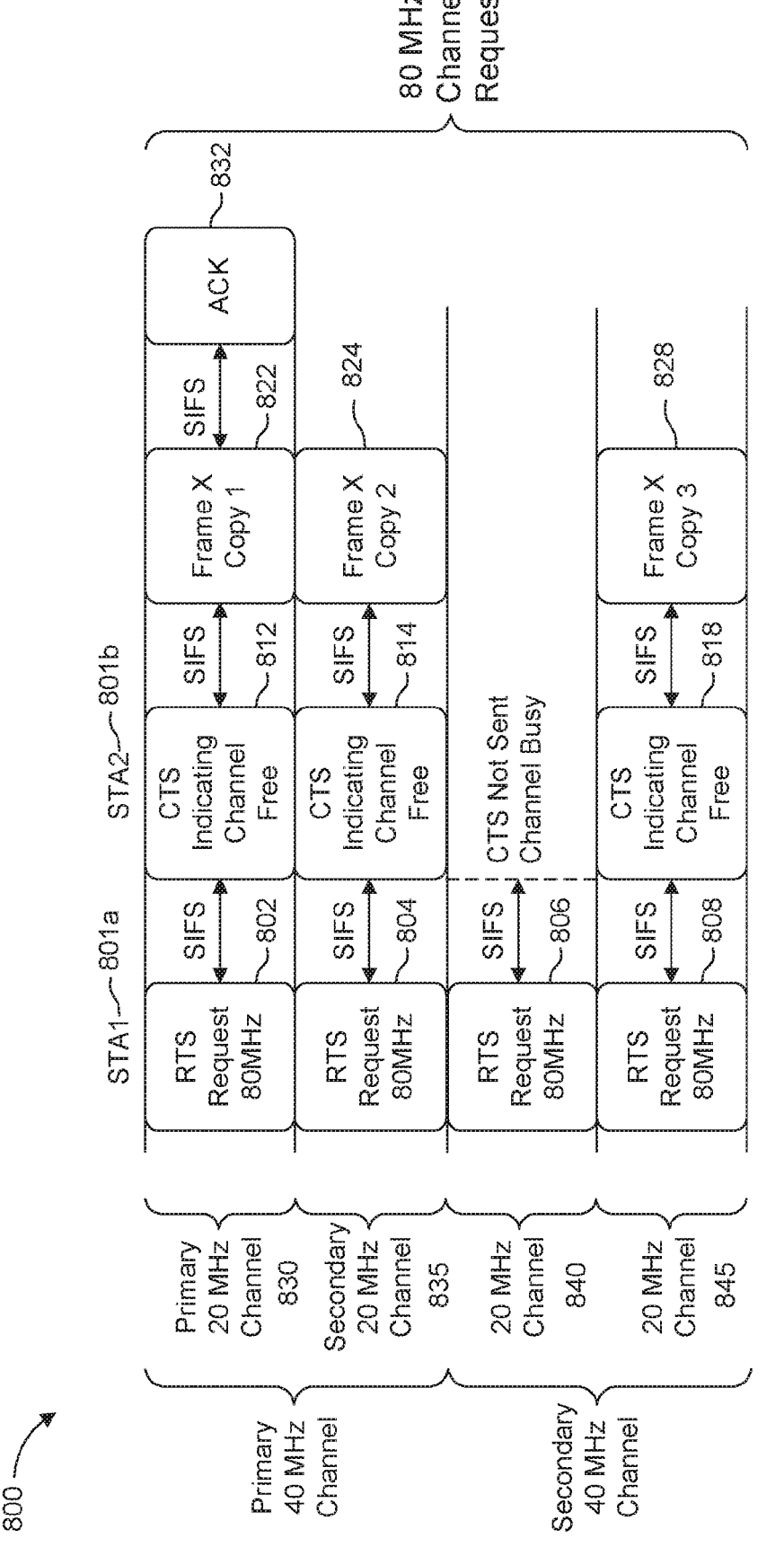
FIG. 8 is a diagram illustrating an example frequency replication-DBO (FR-DBO) with simultaneous transmissions of multiple copies of a frame.

FIG. 8 illustrates an example Frame Replication-DBO (FR-DBO) with simultaneous transmissions of multiple copies of a frame, which may be used in combination with any of other embodiments described herein. For example, STA1 801a may have at least one set of possible, different configurations that meet reliability requirements (e.g., 60% reliability) of a certain traffic flow such as voice or video traffics. Each configuration in the set of configurations also meets the reliability requirements and may comprise a number of replications of a frame (i.e. redundancy), a channel bandwidth, and a modulation and coding scheme (MCS) associated with the channel bandwidth (e.g., redundancy 3x, 20 MHz, MCS 5 or redundancy 1x, 40 MHz, MCS 2). As illustrated in FIG. 8, STA1 801a may then groupcast or multicast an RTS frame 802, 804, 806, 808 to multiple STAs including STA2 801*b* in all the channels that STA1 801*a* has identified, for example, in a primary 20 MHz channel 830, a secondary 20 MHz channel 835, and 20 MHz channels 840, 845. In response to the RTS frames 802, 804, 806, 808, STA1 may receive, from STA2 801*b*, one or more CTS frames 821, 814, 818 indicating whether the channels 830, 835, 840, 845 received the RTS frames 802, 804, 806, 808 are available. As illustrated in FIG. 8, STA1 801*a* receives three CTS frames 812, 814, 818 indicating that the primary 20 MHz channel 830, the secondary 20 MHz channel 835, and 20 MHz channel 808 are available. STA1 801*a* may then determine that the number of available channels is three. Based on the number of available channels, STA1 801*a* may select a configuration that meets the reliability requirement of the traffic flow from the set of possible configurations. For example, assuming that the reliability requirement of the traffic flow is 60% reliability, STA1 801*a* may select a configuration (for a 20 MHz channel) that comprises redundancy 3×, 20 MHz, and MCS 5 and gives 33% reliability on the 20 MHz channel, for the transmissions of multiple copies of a frame 822, 824, 828 over the three available channels 830, 835, 845. Based on the selected configuration, STA1 801*a* may simultaneously transmit three copies of the frame (i.e. frame X copy 1 822, frame X copy 2 824, and frame X copy 3 828) in the three available channels (i.e. primary 20 MHz channel 830, secondary 20 MHz channel 835, and 20 MHz channel 845). Since the selected configuration (e.g., MCS 5) can give STA1 801*a* a 33% reliability on the transmission of a 20 MHz channel, STA1 801*a* may achieve the reliability requirement of the traffic flow (e.g., 60%) by transmitting three copies of the frame based on the configuration (e.g., MCS 5) that gives STA1 801*a* a 33% reliability on each channel 830, 835, 845. It is noted that STAs 801*a*, 801*b* illustrated in FIG. 8 may be an AP, a bridge, or a WTRU.

In this embodiment, based on the available channels detected by FR-DBO, a plurality of channels and aggregation of channels may be used. Therefore, the original frame (e.g., frame X copy 1 822) and two copies (e.g., frame X copy 2 824 and frame X copy 3 825) of the frame may be transmitted simultaneously. Transmission may need to include the original main channel of the BSSID, so the receiving stations can receive information on what other channels are going to be used.

Regarding the ACK 832 for this frame, one or more options may be utilized: (1) the frame is only acknowledged in the primary channel (no matter what channel bandwidth); (2) the frame is acknowledged in all channels where it is received; and/or (3) a block ACK mechanism is used.

Being able to discover multiple combinations of channels, channel widths and MCSs, may make it possible to generate the best allocation of resources to comply with a certain requirement in terms of reliability. This is further discussed herein.

In one embodiment, there may be intelligent control of the level of redundancy. Following the techniques of the FR-DBO mechanism as discussed herein, for it to be used there may be multiple parameters that need to be considered. This method may address a control mechanism in the AP or STA transmitting the duplicated frames to understand the level of protection needed and configure it accordingly.

Figure 9:
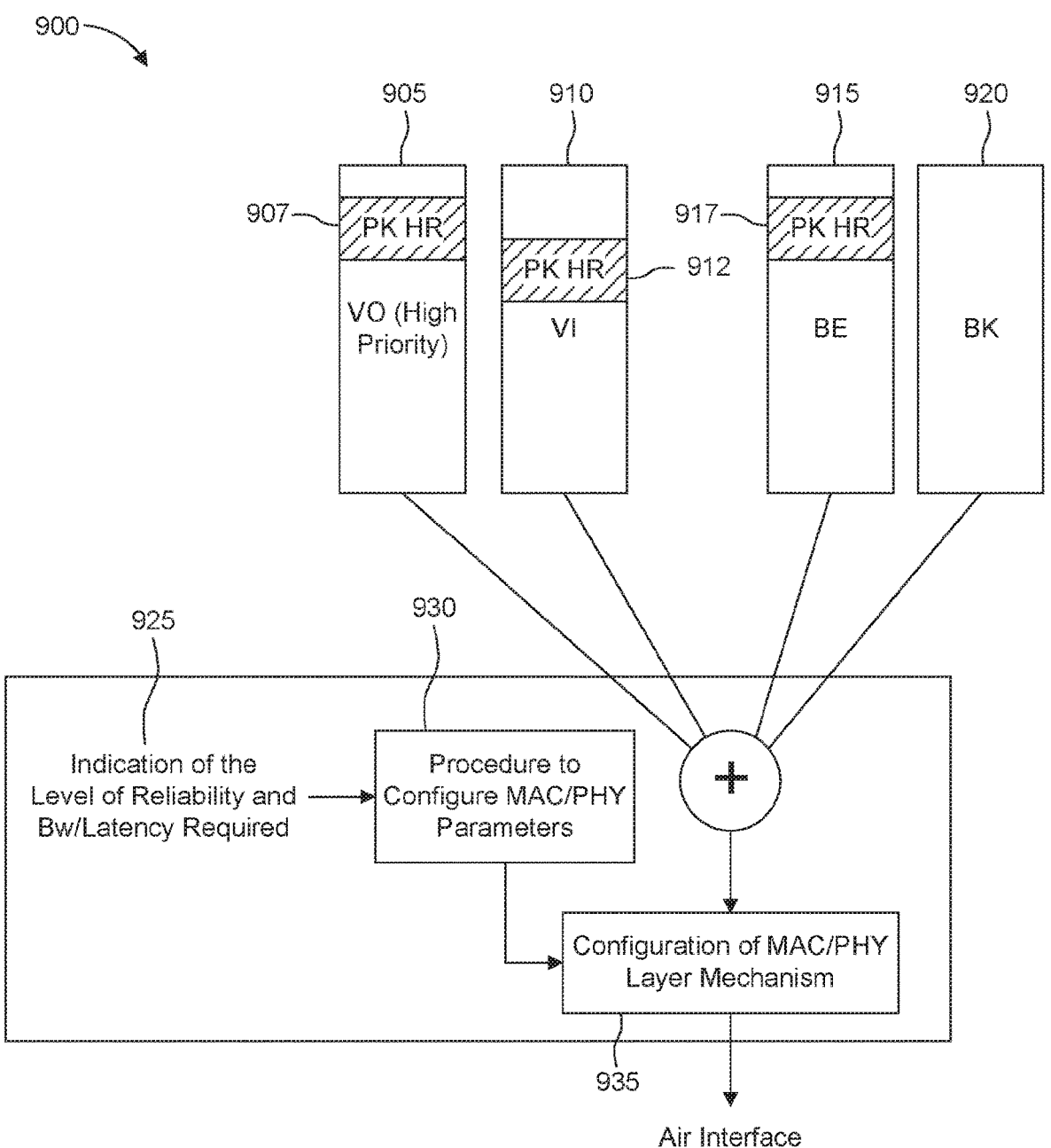
FIG. 9 is a diagram illustrating an example procedure for intelligent control of redundancy level.

FIG. 9 illustrates an example procedure for intelligent control of redundancy level, which may be used in combination with any of other embodiments described herein. As illustrated in FIG. 9, a station (AP, WTRU, or terminal) may have a set of queues 905, 910, 915, 920 (e.g., queues as defined in IEEE 802.11e). Each queue 905, 910, 915, 920 may be associated to a type of traffic such as voice (VO), video (VI), best effort (BE), and background (BE) and a set of MAC parameters that may set the level of priority of the frames while accessing the wireless medium.

On each of the queues 905, 910, 915, 920, there may be packets 907, 912, 917 that are specifically marked so that these packets need High Reliability. These packets 907, 912, 917 are illustrated in FIG. 9 as PK HR. Each of the packets 907, 912, 917 may belong to a different traffic type (i.e. queue) and may have different markings. The marking of these packets 907, 912, 917 may be compatible with FRER, for example, in IEEE 802.1CB.

An external entity or protocol may oversee configuring the mapping between the markings and the traffic characteristics. An example of a possible protocol that can be used for this marking may be Multiple Streams Reservation Protocol (MSRP). These traffic characteristics may include among others: requirements for bandwidth of the flow (e.g., this flow requires at least 10 Mbps); and/or, requirements for reliability (e.g., frame loss probability lower than X) or level of replicability (or many duplicates are sent).

Based on the STA configuration, the STA (e.g., MAC configuration module) may derive a set of configurations for the MAC that can be applied depending on the result of the FR-DBO. For example, a MAC configuration module may read a mark in a frame received from one of the queues 905, 910, 915, 920 (i.e. traffic flow). The mark may include an indication 925 indicating the level of reliability, bandwidth, and/or latency requirement for the traffic flow associated with the frame. Based on reliability requirements indicated by the mark, the MAC configuration module may perform a procedure 930 to configure MAC/PHY parameters such as MCS meeting the minimum bandwidth. The MAC configuration module may generate a set of all possible configurations 935 for the MAC/PHY layer mechanism. A configuration may be selected from the set of configurations and be applied based on the result of FR-DBO (i.e. the number of available channels).

The different mechanisms that may be considered are: different configurations of the aggregation of channels possible, which may be a parameter that sets the maximum rate at which the frame might be sent (e.g., after FR-DBO finishes, the mechanism may come back with an 80 MHz bonded channel available, and this can be used to send a single frame at maximum rate over the 80 MHz channel, or two frames over two 40 MHz channels, or four frames over 20 MHz); modulation coding schemes available for the different channel aggregations, where a lower MCS (less bits per symbol) may result in a higher reliability, since lower SINR may be required for decoding without errors the frame; and/or, measured level of loses per STA and MCS.

In considering these parameters and the requirements configured for each flow, the MAC/PHY configuration mechanism may select a configuration that will meet the requirements depending on the result of the DBO for this specific frame.

FIG. 10 illustrates an example procedure 1000 for transmissions of multiple copies of a frame based on FR-DBO and a configuration of MAC properties as a function of the reliability factor, which may be used in combination with any of other embodiments described herein. The process of selecting the configuration to apply (i.e. step 1060) may be done before or after FR-DBO (i.e. step 1050) with generation of other information (i.e. steps 1010~1040), depending on the processing capabilities of the station. The procedure 1000 may start, at step 1010, by reading a new frame associated with a traffic flow for transmission. This frame may include a mark indicating that the traffic flow requires a certain level of reliability. The STA performing the procedure 1000 may look up its configuration to obtain the requirements of this flow. The requirements may be specified as a minimum BW and a reliability level. For example, a reliability level 1 means that no losses are allowed.

At step 1020, the STA may select, for example, based on the minimum bandwidth requirement, an MCS for each channel that can meet the required data rate for the traffic flow. For example, for the minimum bandwidth 150 Mbps, MCS 5, 6, and 7 may be selected for a 20 MHz channel, MCS 2, 3, and 4 may be selected for a 20 MHz channel, and all MCSs may be selected for a 80 MHz channel.

At step 1030, the STA may read internal information on losses per selected MCS and SINR of a target STA. The STA may then calculate the probability of error (or probability of fail) for each of the selected MCS, considering the last measurement of SINR of the target station. For example, the probably of error may be 0.1 for the MCS 5 associated with a 20 MHz channel, 0.2 for the MCS 6 associated with a 20 MHz channel, and/or 0.3 for the MCS 7 associated with a 20 MHz channel.

At step 1040, the STA may generate, based on the information determined at step 1040 (e.g., probability of fail) at least one set of possible configurations, considering the different data rates available (MCS), possible channel aggregation options and the number of duplicated frames needed for the channel given MCS. Each of the set of possible configuration may comprise a number of replications (redundancy) of a frame, channel bandwidth, and MCS. For example, a set of possible configuration may include redundancy 2x for a 20 MHz channel given MCS 5, and redundancy 1x for a 40 MHz channel given MCS 2.

Once the set of possible configurations is created, at step 1050, the STA may perform FR-DBO procedure as described above. Based on the result information (e.g., the number of the reserved channels fed back into the STA), at step 1060, the STA may select a configuration from the set of possible configurations. At step 1070, the STA may apply the selected configuration to transmit multiple copies of the frame simultaneously over the available channels determined by the FR-DBO.

Figure 11:
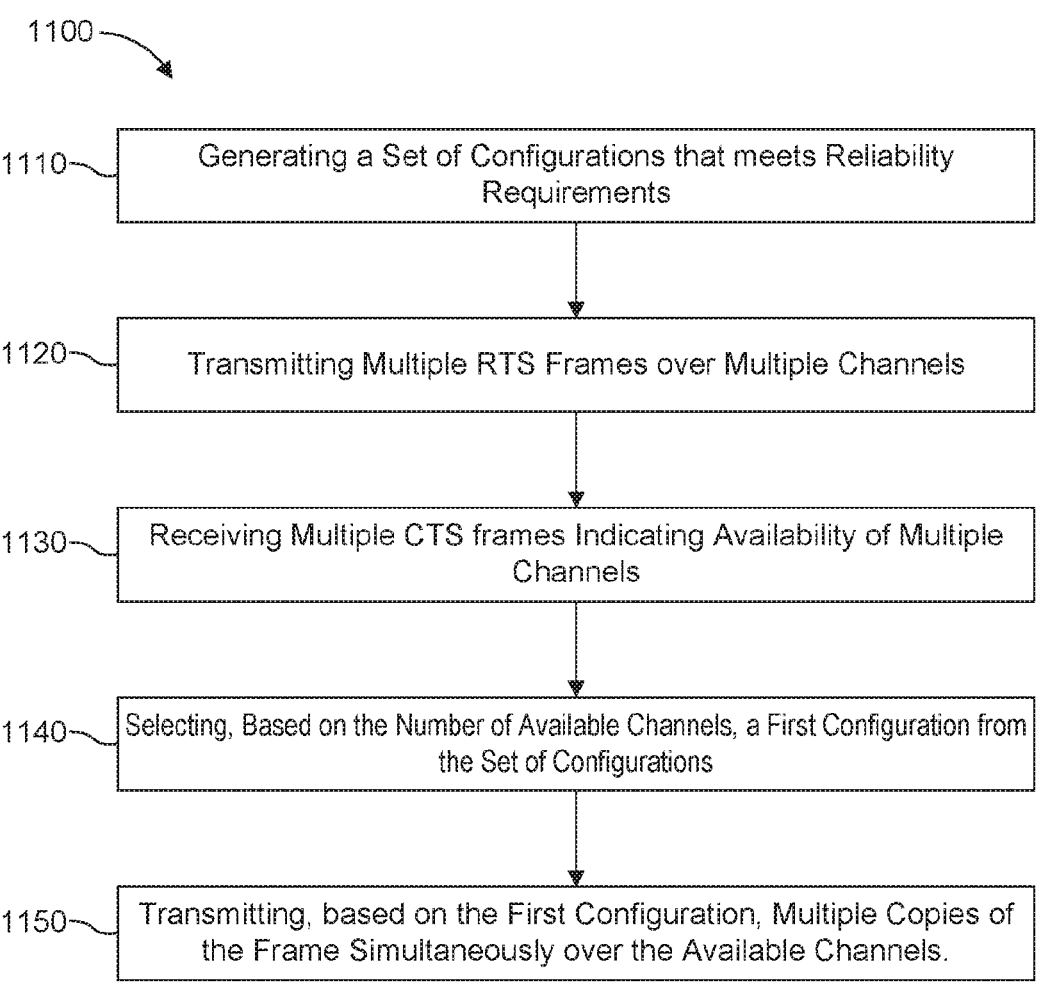
FIG. 11 is a diagram illustrating another example procedure for transmissions of multiple copies of a frame based on FR-DBO and a configuration of MAC properties as a function of the reliability factor.

FIG. 11 illustrates another example procedure 1100 for transmissions of multiple copies of a frame based on FR-DBO and a configuration of MAC properties as a function of the reliability factor, which may be used in combination with any of other embodiments described herein. At step 1110, a STA may generate at least one set of possible configurations that meets reliability requirements of a traffic flow as described above. Each of the set of configurations also meets the reliability requirements. A configuration in the set of configuration may include the number of replications of the frame, a channel bandwidth, and a modulation and coding scheme (MCS) associated with the channel bandwidth. For example, the set of possible configurations may be {{Redundancy 3x, 20 MHz, MCS 5}, {Redundancy 2x, 40 MHz, MCS 2}, {Redundancy 1x, 80 MHz, MCS 1}}. Examples of the reliability requirements may include, but are not limited to, an amount of loss allowed for the traffic flow, latency, a minimum bandwidth and a maximum bandwidth. Examples of the traffic flow may include, but are not limited to, voice traffic, video traffic, best effort traffic, and background traffic. It is noted that generating a set of possible configuration as described in step 1110 may be perform before or after the FR-DBO procedures as described in steps of 1120 and 1130 as an example.

The STA may perform the FR-DBO procedure as described above. For example, at step 1120, the STA may transmit multiple RTS frames to one or more neighbor STAs over the multiple channels that the STA has identified. Specifically, the STA may transmit the multiple RTS frames to one neighbor STAs in the multiple channels and, at the same time, also transmit the multiple RTS frames to the other neighbor STA in the multiple channels. These multiple RTS frames may be transmitted based on multicast or groupcast MAC address associated with the neighbor STAs. Upon transmitting the multiple RTS frames, at step 1130, the STA may receive multiple CTS frames that indicate whether the multiple channels are available or not. Based on the received multiple CTS frames, the STA may determine the number of available channels. In one embodiment, the STA may receive only one CTS frame and in this case, the number of available channel is one.

At step 1140, the STA may select, based on the number of available channels, a first configuration from the set of configurations that meets the reliability requirements for the traffic flow. In the example illustrated in FIG. 8, the STA may determine that three channels are available based on the received CTS frames. Assuming that the reliability requirement is 60% and transmissions at MCS 5 gives 33% of reliability on each channel, the STA may select {Redundancy 3x, 20 MHz, MCS 5} as the first configuration. At step 1050, the STA may apply the first configuration into the transmission and may transmit three copies of the frame over the three available channels simultaneously. Since the each transmission has 33% reliability, multiple copies of transmission with 33% may provide more than 60% reliability, thereby satisfying the reliability requirement of the traffic flow. It is noted that the STA may also apply a second, third configurations into the transmissions of multiple copies of a frame depending on the reliability requirements and the number of available channels.

In one embodiment, there may be the use of FR-DBO in groupcast communication. As explained herein, FRER may be a mechanism that enables the duplication of frames of a flow in multiple sub-flows following disjoint paths to improve the reliability of the network.

In the case of GLK networks, FRER can be used since IEEE 802.11-GLK can be seen as an IEEE 802.1Q compliant port. In addition, IEEE 802.11ak may be able to use the inherent multicast capabilities of WLAN to duplicate the frames on the wireless medium by sending them to a groupcast address, which in the case of GLK stations is the SYNRA address.

A limitation in IEEE 802.11 operation is that the DBO mechanism is only defined for point to point links, so two stations are able to agree on the channel bandwidth to use through the DBO mechanism. However, it is not specified for the groupcast transmission that can only relay on static channel configurations, therefore effectively using a low rate due to the overload of the current WLAN channels.

Techniques and mechanisms described herein may use the GLK-GCR RTS/CTS exchange defined above to extend the DBO mechanism to groupcast. In this way, transmissions can use a wider dynamic channel assignment.

In one example, there may be a procedure where an AP exchanges a GLK-GCR RTS indicating in the SYNRA (e.g., AID Order type) the stations to answer with Bandwidth proving CTS. This may be advertised in the TA field of the RTS. After the GLK-GCR RTS procedure concludes, the AP may be able to compute the best allocation of channel bandwidth that all stations see free, therefore being able to send the frames at a higher speed to the group of stations.

When the number of stations being addressed is high, multiple CTS frames may be generated and the channel may remain busy exchanging control frames during some time. This effect may be minimized if a mechanism such as GLK GCR Block ACK is used, enabling many frames to be sent at high speed.

Figure 12:
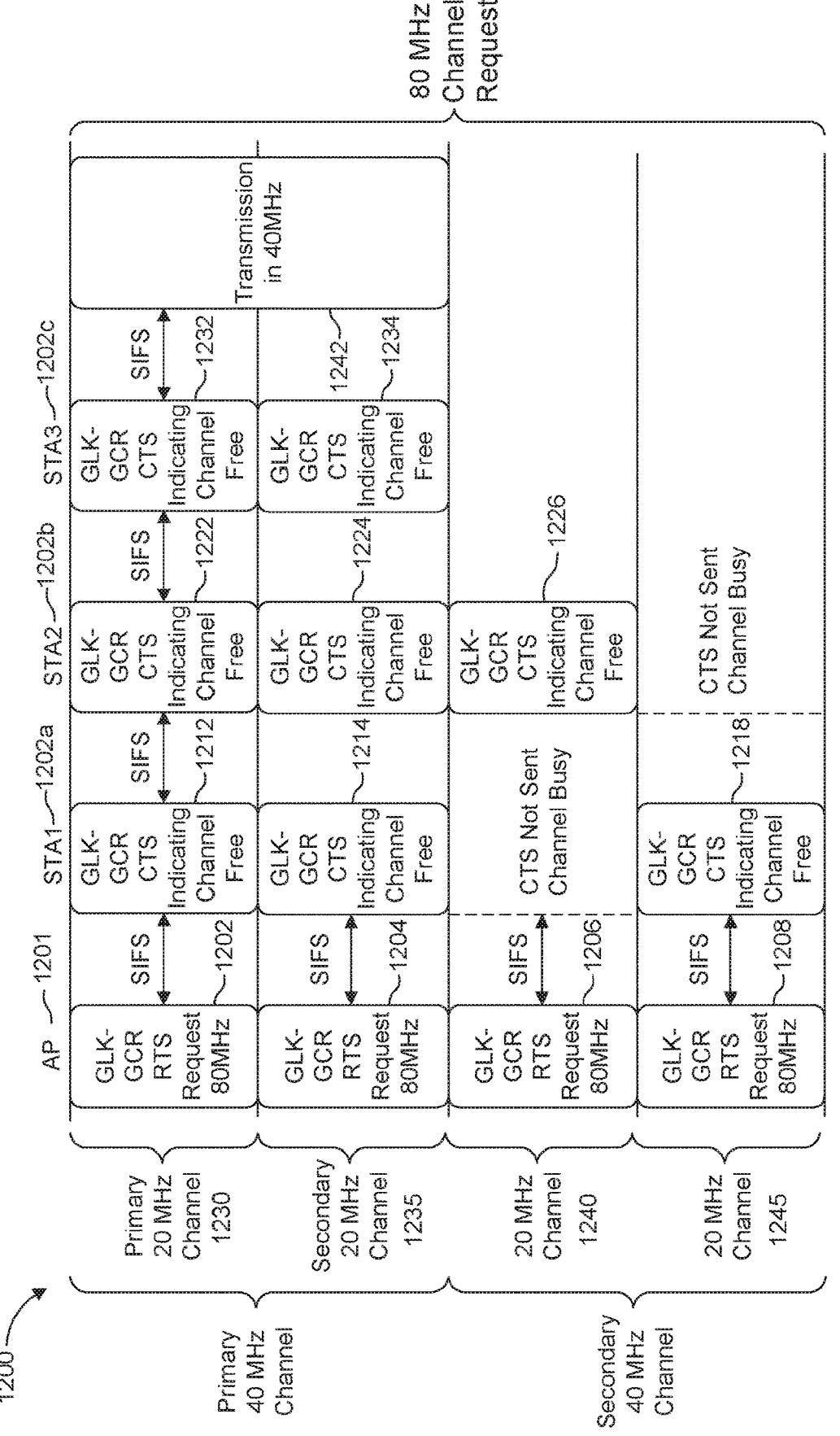
FIG. 12 is a diagram illustrating an example DBO for generic link-groupcast operation with retries (GLK-GCR) transmission.

FIG. 12 is a diagram illustrating an example DBO 1200 for generic link-groupcast operation with retries (GLK-GCR) transmission, which may be used in combination with any of other embodiments described herein. In the above figure, STA1 1202*a*, STA2 1202*b* and STA3 1202*c* may answer with the GLK-GCR CTS frames 1212, 1214, 1218, 1222, 1224, 1226, 1232, 1234 in the order defined by the AID Order SYNRA.

As illustrated in FIG. 12, an AP 1201 may perform FR-DBO to a group of stations, STA1 1202*a*, STA2 1202*b*, STA3 1202*c*, to negotiate the best channel allocation, bandwidth and MCS that can be used to groupcast a frame to the set of stations 1202*a*, 1202*b*, 1202*c*. By using the techniques described above, the AP 1201 may send GLK-GCR RTS/CTS frames 1202, 1204, 1206, 1208 in multiple channels that the AP 1201 has identified. Each of the GLK-GCR RTS frames 1202, 1204, 1206, 1208 may include an AID Order SYNRA. Stations 1202*a*, 1202*b*, 1202*c* receiving the GLK-GCR RTS frames 1202, 1204, 1206, 1208 may answer in the order indicated in the AID Order SYNRA. For example, STA1 1201*a* may first respond GLK-GCR CTS frames 1212, 1214, 1218 in the primary 20 MHz channel 1230, secondary 20 MHz channel 1235, and 20 MHz channel 1245, respectively. STA2 1201*b* may then respond GLK-GCR CTS frames 1222, 1224, 1226 in the primary 20 MHz channel 1230, secondary 20 MHz channel 1235, and 20 MHz channel 1240, respectively. Lastly, STA3 1201*c* may respond GLK-GCR CTS frames 1232, 1234 in the primary 20 MHz channel 1230 and secondary 20 MHz channel 1235, respectively. Following the FR-DBO mechanism, STAs 1202*a*, 1202*b*, 1202*c* may answer in all channels (or all the available channels, or the ones indicated in the GLK-GCR RTS frames 1202, 1204, 1206, 1208). After receiving all the answers, the AP 1201 may perform procedures as described above to compute the best allocation of resources. The AP 1201 may then transmit multiple copies of the frame to the group of stations 1202*a*, 1202*b*, 1202*c*.

In one embodiment, there may be a process to increase reliability of transmission over 802.11 networks by simultaneously sending multiple replicated or redundant frames, using opportunistic channel bonding and high MCS to achieve lowest possible latency. An AP or STA may need to send frames to a group of stations with high-reliability. The AP or STA may send enhanced Group Cast with Retries (GCR) RTS frames to block (or bond) the several channels for a group transmission. Addressed STAs may respond with GCR-CTS frames in the order indicated in the GCR-RTS frames. The AP or STA may configure the MAC/PHY transmission parameters depending on the available channels and required reliability factor. The AP or STA may transmit duplicated frames (Frame Replication, FR-DBO) making use of the complete available bandwidth. The STAs may acknowledge the frame in the primary channel, all channels, available channels, or with a block ACK.

In one embodiment, there may be a process for addressing reliability of transmission over 802.11 networks by simultaneously sending multiple replicated frames, using opportunistic channel bonding and high MCS to achieve lowest possible latency. There may be an extension to the RTS/CTS mechanism (e.g., GCR RTS/CTS) in order to block the several channels for a group transmission. This mechanism may also be extended to GLK networks (GLK-GCR RTS/CTS). Then, there may be an extension to the Dynamic Bandwidth Operation (DBO) mechanism to transmit duplicated frame (Frame Replication, FR-DBO) making use of the complete available bandwidth and a procedure to configure the transmission depending on the available channels and reliability factor required. Finally, there may be combining of the GCR RTS/CTS, GLK-GCR RTS/CTS and the FR-DBO, and a mechanism to perform FRER using all available bandwidth and higher order MCS may be defined.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a first station (STA), the method comprising:

transmitting, to a second STA, a plurality of request to send (RTS) frames over a plurality of channels;

receiving, from the second STA, a plurality of clear to send (CTS) frames, each CTS frame being received on a corresponding channel and indicating availability of that channel;

determining, based on the received CTS frames, a number of available channels;

determining one or more reliability requirements of a traffic flow associated with a frame;

determining, based on the number of available channels, the one or more reliability requirements, and per-modulation-and-coding-scheme (MCS) error probabilities computed using a measured signal-to-interference-plus-noise ratio (SINR) for the second STA, a configuration including a replication count of the frame, a channel bandwidth, and an MCS for the channel bandwidth, wherein the configuration satisfies the one or more reliability requirements, the MCS is selected to meet a minimum bandwidth requirement of the traffic flow, and the replication count is less than or equal to the number of available channels;

transmitting, based on the determined configuration, a number of identical copies of the frame equal to the replication count, without channel bonding, simultaneously, over a number of the available channels equal to the replication count, including a primary channel of a basic service set identifier (BSSID) of the first STA; and receiving an acknowledgment for the frame on the primary channel.

2. The method of claim 1, wherein the plurality of RTS frames are transmitted using a multicast medium access control (MAC) address associated with the second STA.

3. The method of claim 1, wherein the one or more reliability requirements of the traffic flow comprise an amount of loss allowed for the traffic flow, a minimum bandwidth, a maximum bandwidth, and an average bandwidth.

4. The method of claim 1, wherein the traffic flow includes voice traffic, video traffic, best effort traffic, or background traffic.

5. The method of claim 1, wherein the frame includes a mark indicating the reliability requirement and a minimum bandwidth requirement of the traffic flow.

6. The method of claim 1, wherein the identical copies include duplicated copies of a physical layer protocol data unit (PPDU).

7. The method of claim 1, the replication count equals the number of available channels.

8. A first station (STA) comprising:

a processor;

a transmitter; and a receiver, the processor and the transmitter configured to:

transmit, to a second STA, a plurality of request to send (RTS) frames over a plurality of channels;

receive, from the second STA, a plurality of clear to send (CTS) frames, each CTS frame being received on a corresponding channel and indicating availability of that channel;

determine, based on the received CTS frames, a number of available channels;

determine one or more reliability requirements of a traffic flow associated with a frame;

determine, based on the number of available channels, the one or more reliability requirements, and per-modulation-and-coding-scheme (MCS) error probabilities computed using a measured signal-to-interference-plus-noise ratio (SINR) for the second STA, a configuration including a replication count of the frame, a channel bandwidth, and an MCS for the channel bandwidth, wherein the configuration satisfies the one or more reliability requirements, the MCS is selected to meet a minimum bandwidth requirement of the traffic flow, and the replication count is less than or equal to the number of available channels;

transmit, based on the determined configuration, a number of identical copies of the frame equal to the replication count, without channel bonding, simultaneously, over a number of the available channels equal to the replication count, including a primary channel of a basic service set identifier (BSSID) of the first STA; and receive an acknowledgment for the frame on the primary channel.

9. The first STA of claim 8, wherein the plurality of RTS frames are transmitted using a multicast medium access control (MAC) address associated with the second STA.

10. The first STA of claim 8, wherein the one or more reliability requirements of the traffic flow comprise an amount of loss allowed for the traffic flow, a minimum bandwidth, a maximum bandwidth and an average bandwidth.

11. The first STA of claim 8, wherein the traffic flow includes voice traffic, video traffic, best effort traffic, or background traffic.

12. The first STA of claim 8, wherein the frame includes a mark indicating the reliability requirement and a minimum bandwidth requirement of the traffic flow.

13. The first STA of claim 8, wherein the identical copies include duplicated copies of a physical layer protocol data unit (PPDU).

14. The first STA of claim 8, the replication count equals the number of available channels.

* * * * *